United States Patent [19]
Lienhop

[11] Patent Number: 5,944,532
[45] Date of Patent: Aug. 31, 1999

[54] EDUCATIONAL FUNGAL SPORE AND BACTERIA MICROSCOPY KIT

[76] Inventor: Marie T. Lienhop, 4316 McClay Rd., St. Charles, Mo. 63304

[21] Appl. No.: 08/888,674

[22] Filed: Jul. 7, 1997

[51] Int. Cl.⁶ .............................. G09B 23/00; A63H 33/04
[52] U.S. Cl. .............................. 434/295; 434/276; 446/75
[58] Field of Search .................................. 434/295, 276, 434/365, 403, 296; 206/456; 446/72, 75

[56] References Cited

U.S. PATENT DOCUMENTS

| | | | |
|---|---|---|---|
| D. 265,346 | 7/1982 | Maier | D24/230 |
| 1,350,237 | 8/1920 | Porter | 434/298 |
| 2,302,934 | 10/1942 | Barol | 434/295 |
| 2,790,547 | 10/1957 | Sutton | 206/571 |
| 3,191,319 | 6/1965 | Waisgerber | 434/299 |
| 3,203,540 | 8/1965 | Kalt | 206/569 |
| 3,532,412 | 10/1970 | Miller | 156/108 |
| 3,594,923 | 7/1971 | Midgley | 434/298 |
| 3,613,265 | 10/1971 | Stern et al. | 428/13 |
| 3,755,925 | 9/1973 | Court | 434/299 |
| 3,841,001 | 10/1974 | Nicholson | 35/18 A |
| 4,195,059 | 3/1980 | Whitcher et al. | 422/61 |
| 4,497,630 | 2/1985 | Oliver | 434/224 |
| 4,723,914 | 2/1988 | Tachibana | 434/297 |
| 5,025,920 | 6/1991 | Walsh et al. | 206/223 |
| 5,192,211 | 3/1993 | Yeh | 434/296 |

*Primary Examiner*—Kien T. Nguyen
*Assistant Examiner*—Michael B. Priddy

[57] ABSTRACT

An educational fungal spore or bacteria kit is presented which has three dimensional, full-color depictions of the various fungal spores or bacteria grouped together in a kit. The kit is a common compartmented box having a top that closes to secure the contents of the kit when it is not in use. The compartments each contain a variety of three-dimensional, full-color fungal spores or bacteria models depicting all of the constrictions, attachment scars, septas, and other individual characteristics of fungal spores or bacteria. Located in the lid of the kit is a two-dimensional depiction of the three-dimensional fungal spore or bacteria in the base of the kit. The two-dimensional depictions also have the name of the spore or bacteria depicted below, respectively, in the base of the kit for easy reference. The kit may be used when viewing a sample fungal spore or bacteria under a microscope. The unknown fungal spore or bacteria is compared to the three-dimensional, full-color depiction of the fungal spore or bacteria model in the kit thus making identification of the unknown fungal spore or bacteria quite easy. Since the models are made to scale, and since they are three-dimensional and full-color in nature, the microscopist is able to determine the size and color relationships of the spores or bacteria and to use his visual and tactile senses in the identification.

2 Claims, 5 Drawing Sheets

EDUCATIONAL FUNGAL SPORE AND BACTERIA MICROSCOPY KIT

BACKGROUND OF THE INVENTION

This invention relates to the field of educational kits for use in classrooms, hospital laboratories or similar facilities. In particular, this invention discloses a three-dimensional Fungal Spore Kit or Bacteria kit which display the shapes, colors, and other characteristics of typical fungal spores or bacteria for educational purposes.

Many biological organisms trigger allergic reactions, respiratory difficulties, and some types of asthma. Some molds release mycotoxins and metabolites that may cause respiratory or thermal discomfort. These spores are the reproductive units of fungi and their elimination has become a matter of some importance in today's world.

Fungal spores are typically collected by an air-sampling mechanism. The air sampling technique operates on the principle of inertial impaction. Particles in the airstream are drawn through a slit of an air-sampling apparatus and directed to a sticky surface at a flow rate of approximately 10 to 15 liters per minute. The particles (mold spores in this case) become lodged onto the adhesive surface of the glass slide. The sample is stained, magnified 1,000 times and analyzed for the presence of fungal spores with a microscope. The microscopist often relies upon spore morphology to identify them to the genus level. Some genera are grouped together because they cannot be identified based on their microscopical morphology alone. The difficult-to-identify fungi and unremarkable fungi require a more time consuming and definitive culture technique.

In regard to the various types of fungi and their environments, it would be helpful to know the definition of certain terms. A fungus is any of a large group of Thallophytes (a subkingdom without clear distinction of roots, stems or leaves and not producing flowers or seeds), and includes molds, mildews, mushrooms, rusts and smuts which are parasites on living organisms or feed on dead organic materials. Fungi lack chlorophyll and will reproduce through means of spores.

A mold is any of the various fungal growths which degrade organic matter. Mildew is a superficial coating or discoloring of organic materials such as cloth, leather, vapor, paint and etc., that is caused by fungal metabolic activities. Mildew usually occurs in damp conditions.

The identification of these fungi is of critical importance to the environmental well-being and healthy condition of the air and surroundings of humans. While there are textbooks which depict the shapes and colors of various fungi, none of the books in the prior art make available to the microscopist or student a three-dimensional depiction of the various fungi along with the color shading and other identifying characteristics.

Since it is often important to distinguish between the various fungi in order to eradicate or deal with their presence, it would be most helpful to have a three-dimensional kit or set of three-dimensional, full-color fungi which may be used both as a learning tool in an educational setting and as a comparative tool in a professional, microscopic identification process. It is an object of this invention to provide a number of kits which include three-dimensional full-color depictions of typical fungal molds or bacteria encountered in the human environment. While this invention is not intended to replace traditional reference sources, it is a further object of this invention to provide a quite useful tool to aid in the identification of fungi by means of three-dimensional, full-color reference sources.

It is a still further object of this invention to augment traditional reference materials such as books and slides by allowing one to study the spores through visual and tactile senses by observing and touching actual three-dimensional, full-color depictions of these spores.

It is a further object of this invention to provide three-dimensional models as examples of a few of the mold spores that are commonly found in the air, or of typical bacteria.

Bacteria are also studied in high schools, colleges and universities. Bacteria are important in that they are often associated with food consumed by humans. These bacteria include five common food-borne pathogens (Listeria, Campylobacter, Staphylococcus, *Escherichia coli*, and Salmonella). These food-borne pathogens can be deadly, as evidenced by the Salmonella incidents in the United States in the recent past.

A bacterium is classified into one of several categories by a differential staining method devised by Christian Gram in 1884. Gram's method allows one to distinguish between various bacteria which may exhibit similar morphology. The microorganisms present can be grouped Gram Positive (stain purple/blue) and Gram Negative (stain red) according to their reactions. The Gram Stain technique is an important diagnostic tool in subsequent identification procedures.

Many bacteria retain the violet iodine combination and stain purple (often appearing blue under the microscope). The walls of Gram Positive bacteria retain the purple/blue stain. The Gram Negative bacteria cannot retain the purple/blue stain. Instead the walls of Gram Negative bacteria show the red color caused by the remaining Safranin stain.

It is a still further object of this invention to provide a bacteria kit which includes the common food-borne pathogens and which aids in the identification of these bacteria in a manner similar to the fungal spore kit described above.

Other and further objects of this invention will become apparent upon reading the below described Specification and Claims.

BRIEF DESCRIPTION OF THE INVENTION

This invention comprises an essentially rectangular box, or kit, which is divided into a number of different compartments housing three-dimensional, full-color representations of various fungal spores. A second kit would contain representations of common bacteria. The three-dimensional representations of fungi are magnified approximately 2,000 times the actual size and the bacteria are magnified 10,000 times. These are designed to aid a student or researcher in identifying the various different types of fungal spores or bacteria. Each kit or box contains actual, three-dimensional representations of the spores, while the lid of the box contains a two-dimensional representation of the three-dimensional spores in the box. The lid is arranged such that the two-dimensional name and description of the three-dimensional spore or bacterium corresponds to the location in the box where that three-dimensional microorganism will be found. A typical kit will contain between 10 and 20 representative samples of fungal spores or bacteria typically encountered in research of this discipline.

BRIEF DESCRIPTION OF THE DRAWING FIGURES

FIG. 4 is an enlarged Drawing Figure of one of the bacteria contained in the Kit #2.

FIG. 5 is another enlarged figure of a typical fungal spore found in the fungal spore kit.

DETAILED DESCRIPTION OF THE INVENTION

Figure 1:
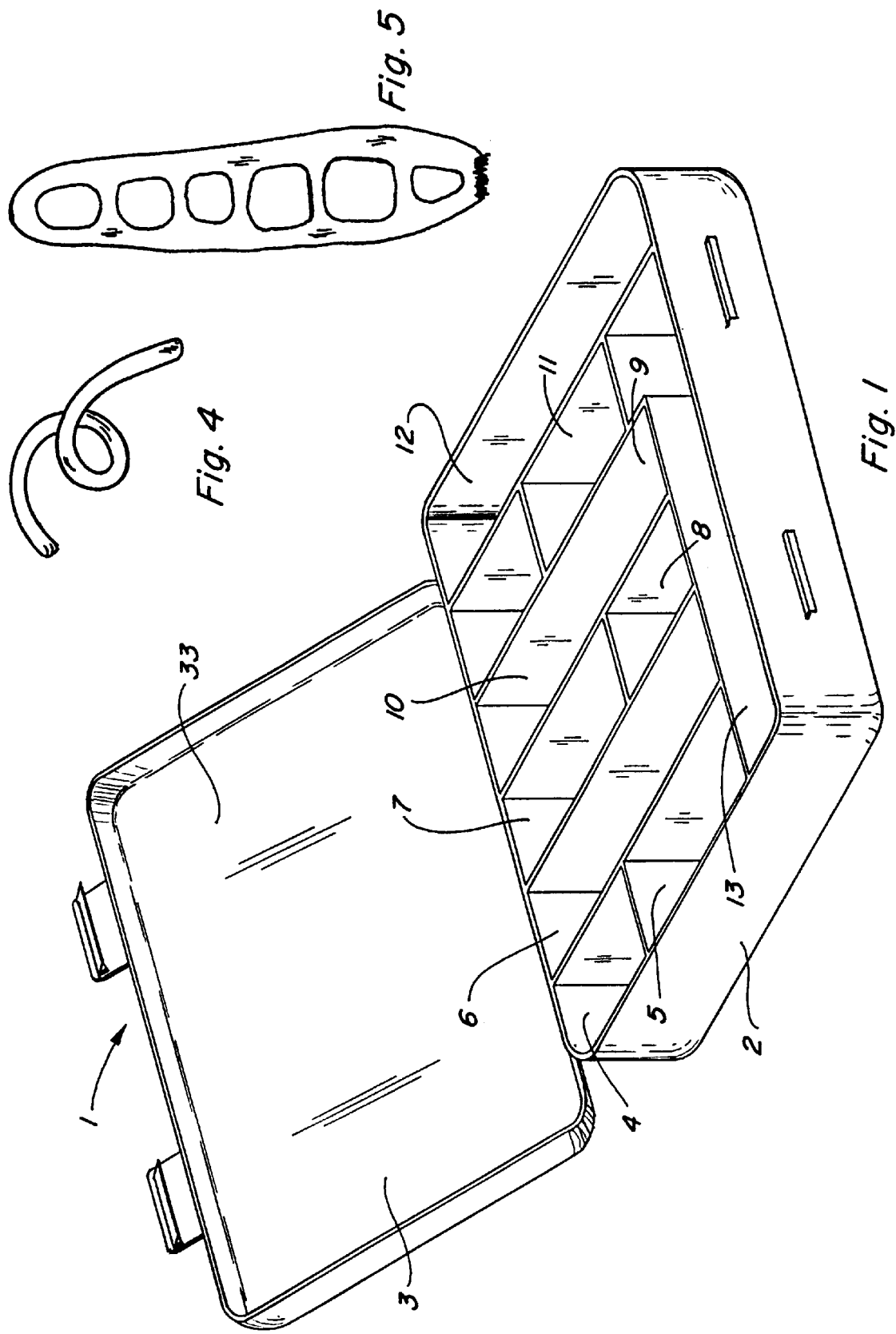
FIG. 1 is perspective view of the fungal spore or bacteria kit, showing the various compartments and the lid containing the two-dimensional descriptions of the contents of the kit.

The fungal spore kit comprises an essentially rectangular box 1 as shown in Drawing FIG. 1. This box has an essentially rectangular, compartmented three-dimensional base 2 and an essentially flat top 3. The flat top 3 is hinged to the essentially rectangular base 2 by conventional hinged means. Inside the rectangular three-dimensional base are a number of three-dimensional compartments which are adapted to receive the various three-dimensional depictions of the fungal spores or bacteria. The fungal spores or bacteria vary in length and overall size, and hence the compartments would vary in size to accommodate reception of these fungal spores, as illustrated in FIG. 1.

The three-dimensional depiction of these fungal spores and bacteria shows not only the general size and shape of a spore, but also shows various typical other markings or indentations which make spore identification possible. The actual fungal spore or bacteria models may be made of polyurethene or a similar material and then may be painted so that the spore has the same visual dimensions and color characteristics as spores in real life under the microscope. The model could also be made of dry clay and then may be pain ted these appropriate colors.

For example, an apical pore is a terminal opening or thinning of the end of the spore which makes it appear as though an opening lies just beneath the surface. Some spores might have an attachment scar which is a mark that remains at one or more parts of the spore (usually at the ends) after separation or detachment from the spore-bearing structure.

Other spores may have a constriction, or an area around the middle of the spore which makes the spore appear as though it has an invisible rubber band stretched around its middle. A foot cell is the last cell or segment that bends abruptly near its end. A refractive scar is an attachment area of the spore which is dark and thickened. It refracts light to appear darkened or black while moving the microscope's fine focus knob up and down. A septa or septation is an area of a spore that is divided into more than one segment by a darkened area or line.

One or all of the above characteristics may be present in the various fungal spores to be identified. In addition, their length with respect to their width or height, their thinness or fatness, their various colorations, and other characteristics are all important in identifying the particular spore under examination.

Particular spores have particular characteristics all of which are important to the functioning and use of this kit for educational o r other purposes. The typical spores encountered in investigation of this type are contained in one or more of the kits claimed in this invention. Their general characteristics can be summarized as follows:

Torula spores are 20–65×5–10 micrometers in size often found in straight chain and sometimes branched chain formation. The dark brown or olive brown chains may contain rounded or broken ends. The chains are usually strongly constricted at the septa.

Helminthosporium and Drechslera spores are very large (40–180×14–23 micrometers) in size. They occur singly and contain extremely thick outer walls. The spores may be straight or curved, ellipsoid, or slightly club shaped. Their pseudoseptate appearance (false septation) distinguishes them from most other genera. Their color varies from light brown, golden brown, pale or dark brown to olivaceious brown. Sometimes the spores are nearly colorless and smooth. A dark brown or black scar is usually obvious at the base of the spore.

Cladosporium spores vary tremendously in size (3–25× 2–10 micrometers). Spores occur in chains (often branched), but may be found singly. The spores appear barrel-like, cylindrical, spindle-shaped, pointed at both ends, egg-shaped, or spherical in shape. They usually show protuberant, often refractive scars at the ends. Color ranges from pale, tan brown to olivaceous brown. Cladosporium spores may be smooth, rough, spiny, or wart-like in appearance.

Stachybotris spores range from 6–10×2–3 micrometers in size. Oblong to oval in shape, they appear gray or light gray-brown with black splotches on their exterior. Stachybotris spore texture is rough. No septation, pores or attachment scars are present.

Erysiphae and oidium spores are quite large (30–40×8–15 micrometers) in size. They may be found singly or in chains. The spores are oblong, barrel-shaped with flattened ends and contain no color. The surface may be smooth or somewhat roughened.

Peronospora spores range from 20–30×10–15 micrometers in size and appear tan or nearly colorless. Their shape is ovate with one-widened end. The other end tapers to a point. Peronospora spores occur singly and often contain an attachment point on the narrow end of the spore. The spore margin is frequently enlarged.

Stemphyllium spores vary in size, 25–45×25–30 micrometers. They are oblong, ellipsoid, slightly club-shaped, rounded on the ends, and found singly. An appendage may be observed at one end. The spores contain transverse, longitudinal, and oblique septa. The spores may be smooth, warty, or spiny and are pale olive to dark olive-brown in color. The midsection is usually constricted as though a rubber band is wrapped around the spore's center.

Pithomyces spores vary in size, 15–30×10–18 micrometers. Spores may be oblong, club-shaped, or barrel-shaped when the end cells collapse inward. They occur singly and often contain three transverse and one longitudinal septa but no oblique septa. Spores are straw-colored to dark brown and dark brown-black. Their surfaces may be smooth, warty, or rough with slightly raised pointed projections.

Uredinales spores vary in size, 25–40×15–25 micrometers. They are found singly or in clumps and are irregularly spherical, club-shaped, or oval-shaped. Their thick walls often contain spiny projections or lines on the surface. The spore usually contains a flat broad attachment area at the spore's base. The central contents of the spore are bright yellow to yellow-orange in color while the walls are colorless. Sometimes the entire spore lacks color. The spores occasionally contain transverse septa.

Epicoccum spores vary in size. They are usually 14–26 micrometers but are frequently much smaller or larger. The larger spores may be as large as 40–50 micrometers. The spores occur singly and are gold, gold-orange, orange-brown, to brown-black in color. Near the broad point of attachment, the septa are small and obscure. Farther away from the attachment area, the septa are more easily seen and larger. Sometimes the roughly rounded spore shows a circular scar in the spore's center. The spores often appear rough, warty, and multi-septate.

Cerecospora spores are very long (often greater than 50 micrometers) and slender, tapering to an apex. A very conspicuous circular attachment scar (as wide as the spore's diameter) is on the spore's widest end (3–5 micrometers). The smooth spores may be colorless or contain a faint green hue. They often contain multiple septa that may be difficult to see.

Fusarium spores vary in size, 23–50×3–6 micrometers. They are usually found singly or occasionally in clumps. They are fusiform-shaped and contain a foot cell at one end. The spores are usually colorless but occasionally contain a slight pink hue when they are stained with a Calbera stain.

Ascospores vary tremendously in color, shape and size (7 to 100 micrometers). Their shape varies from oval, elliptical, lemon-shaped, cylindrical, to fusiform. Ascospores lack attachment scars, pores, pegs, or attachment areas. Occasionally, they are surrounded by a gelatinous sheath. Transverse septation varies from none to several. They may be colorless, tan, yellow, to dark brown.

Scopulariopsis spores are 8–12 micrometers in size. The round spores are found singly or in chains. An obvious border around the perimeter of the spore with a flattened truncate base on the spore's end is visible. The spore surface has a rough spiny surface. They are usually colorless, but may contain gray to light tan or greenish tint.

Use of this three-dimensional model kit to identify the above described spores or bacteria is accomplished when the microscopist or instructor follows a simple set of instructions. First, the microscopist would rotate the spore under visual inspection under the microscope to its various orientations. Spores orient themselves on the sample slide in such a way that they may not resemble pictures and reference slides in every orientation and therefore the rotation of the spore greatly enhances the ability of the microscopist to make the identification.

The second step in utilizing this three-dimensional kit would be to view the reference material which may now be accomplished without the necessity of removing the sample slide from the microscope stage. The location and view of the questioned sample can thus remain in view in the microscope while the microscopist is looking at the reference spore or bacteria three-dimensional model from the kit.

The third step would be to demonstrate important identifying characteristics of spore morphology, such as attachment scars, foot cells, constrictions, or similar individual characteristics.

The kit can be used to familiarize the microscopist with the size relationships of spores and their structures. It can also be used to teach students and other researchers about spore morphology and the identifying characteristics of mold spores.

In the typical application for this fungal spore kit, an air sampler, microscope and associated implements would be used. The air sampler is used to capture the spore while a light microscope and 100 power Oil Immersion Objective would be used to magnify and view the spores. Slides and coverslips would also be necessary to prepare the sample as would the standard stain and immersion oil. Once the sample has been prepared and placed under the microscope, the three-dimensional kit of mold spores or bacteria can be used in the manner described above to identify spores or bacteria and to teach others in the identification of fungal spores or bacteria unknowns.

Since there are a wide variety of fungal spores and bacteria, and a wide variety of possible applications of these kits, the precise content of the kits would vary considerably. However, two preferred embodiments of the kit have been found to be particularly useful thus far for instructional and educational purposes.

Figure 2:
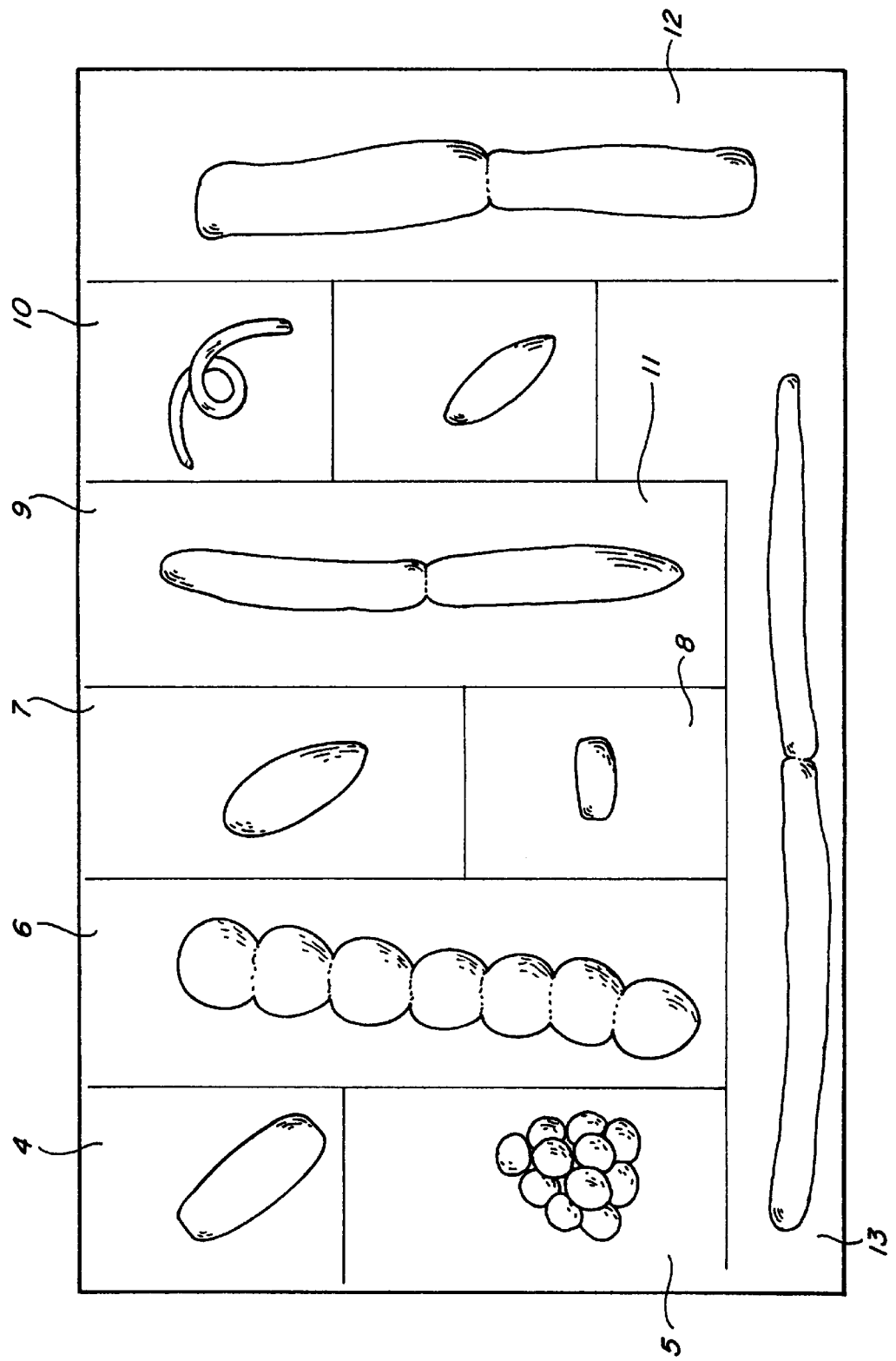
FIG. 2 is two-dimensional depiction of the graphic material located in the lid of the kit, showing two-dimensional depictions of the three-dimensional bacteria located in the base of the kit.

The first kit, and the one depicted in FIGS. 1 and 2, shows ten different compartments containing Gram Positive and Gram Negative bacteria. This kit is an Educational Bacteria Three-Dimensional Model Kit. Bacteria, like fungal spores, vary in size, shape, and appearance. This second kit includes three-dimensional depictions of common bacteria, such as salmonella gram negative. The Salmonella Gram Negative is located at location 4 of the kit as shown on FIGS. 1 and 2. Located in position 5 is Staphylococcus Gram Positive, while Streptococcus Gram Positive is position 6. *Escherichia coli* Gram Negative located in compartment 7, Listeria Gram Positive in compartment 8, Lactobacillus Gram Positive in compartment 9, Campylobacter Gram Negative in compartment 10, Pseudomonus Gram Negative in compartment 11, Bacillus Gram Positive in elongated compartment 12 and Clostridium Gram Positive is located in elongated compartment 13.

Within all of these ten various compartments would be located, in the rectangular compartmented base, the three-dimensional, full-color representations of the above listed bacteria. The graphical chart and locator shown in FIG. 2 would be secured to the inside top of the box at 33.

The five common food-borne pathogens are divided into five separate genus and can be described as follows.

The Salmonella genus includes *Salmonella Enteritidis* and *S. typhi*. They are Gram negative and range from between 2.0–5.0×0.7–1.5 micrometers in size. Salmonella is found in raw meats, poultry, fish, eggs, milk and cantaloupe peelings. However, it may also be found in household pets including turtles, cats, dogs, birds, fish and rodents.

The genus Streptococcus includes beta-hemolytic streptococci. They are Gram positive and range between 0.5–2.0 micrometers in diameter. They may be found in dairy products, water, dust, vegetation, and in the respiratory tract of animals and humans.

The genus Escherichia includes *E. Coli* and *Escherichia coli*. Escherichia are Gram negative and are from 2.0–6.0× 1.1–1.5 micrometers in size. They are found in almost every category of food.

Members of the genus Lactobacillus seldom cause human disease. They are Gram positive and have a size of 0.5–1.2× 1.0–10.0 micrometers. They primarily produce lactic acid from the fermentation of glucose.

Campylobacter genus includes the *Campylobacter jejuni*. Campylobachter are Gram negative and range in size from 0.5–5.0×0.2–0.5 micrometers.

The genus Bacillus is Gram positive and ranges in size from 0.5–2.5×1.2–10 micrometers. Bacillus is widely distributed in nature and frequently contaminates laboratory cultures.

The genus Staphylococcus includes *Staphylococcus aureus* and is Gram positive. Its size is normally between 0.5–1.,5 micrometers.

The genus Listeria includes Listeria mononcytogenes. It is gram positive and ranges in size from 0.5–2.0×0.4–0.5 micrometers. Listeria exhibits tumbling motility and is found nearly everywhere in nature, including meat, poultry, seafood, dairy products, raw milk, potatoes, radishes and cucumbers.

The genus Pseudomonas includes *Psuedomonas fluorescens* and *Pseudomonas aeruginosa*. Pseudomonas is Gram negative and has a size of approximately 0.5–1.0×1.5–5.0 micrometers.

The genus Clostridium includes *C. perfringens* and *C. botulinium*. Clostridium is Gram positive especially in young cultures and has a size of 0.3–2.0×1.5–20.0 micrometers. Clostridium is widely distributed in soil, dust, and water and also found in the intestinal tract, unclean wounds and infections in the body.

In the three-dimensional model bacteria kit, the bacteria are constructed so as to be approximately 10,000 times the actual size of the bacteria as they appear in nature. The bacteria kit models are appropriately colored in accordance with their Gram stain reactions. This unique coloring enables the student or researcher to quickly identify the different types of bacteria by comparing the unknowns with the models.

Another typical kit would contain a different grouping of fungal spores, to be used for slightly different purposes than the Gram Positive or Gram Negative bacteria of Kit #2 shown in FIGS. 1 and 2. This first kit would contain 19 separate fungal spores located in 19 separate compartments in a rectangular compartmented base 2.

Figure 3:
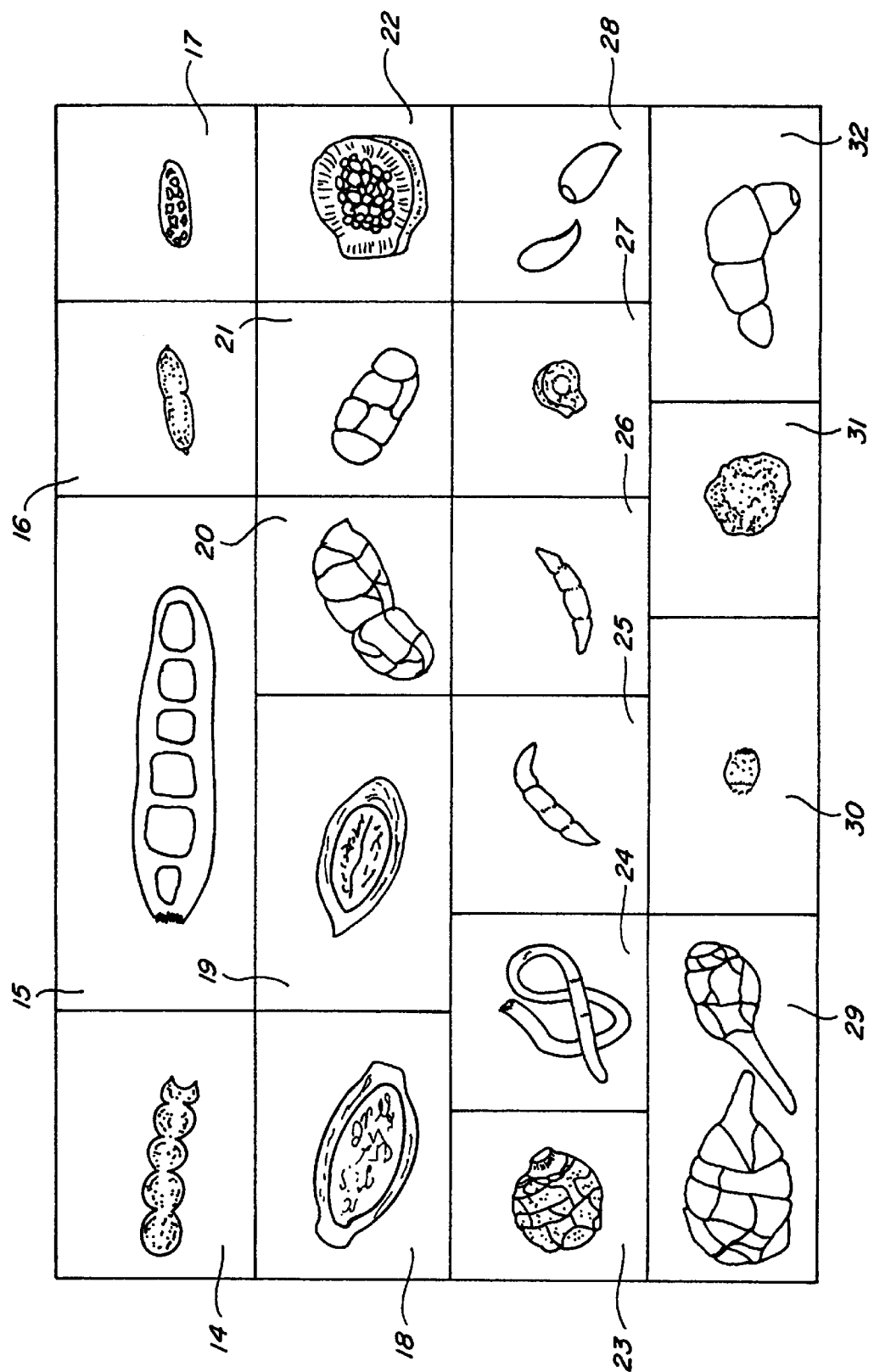
FIG. 3 is similar to FIG. 2, however showing a different grouping of fungal spores.
Figure 6:
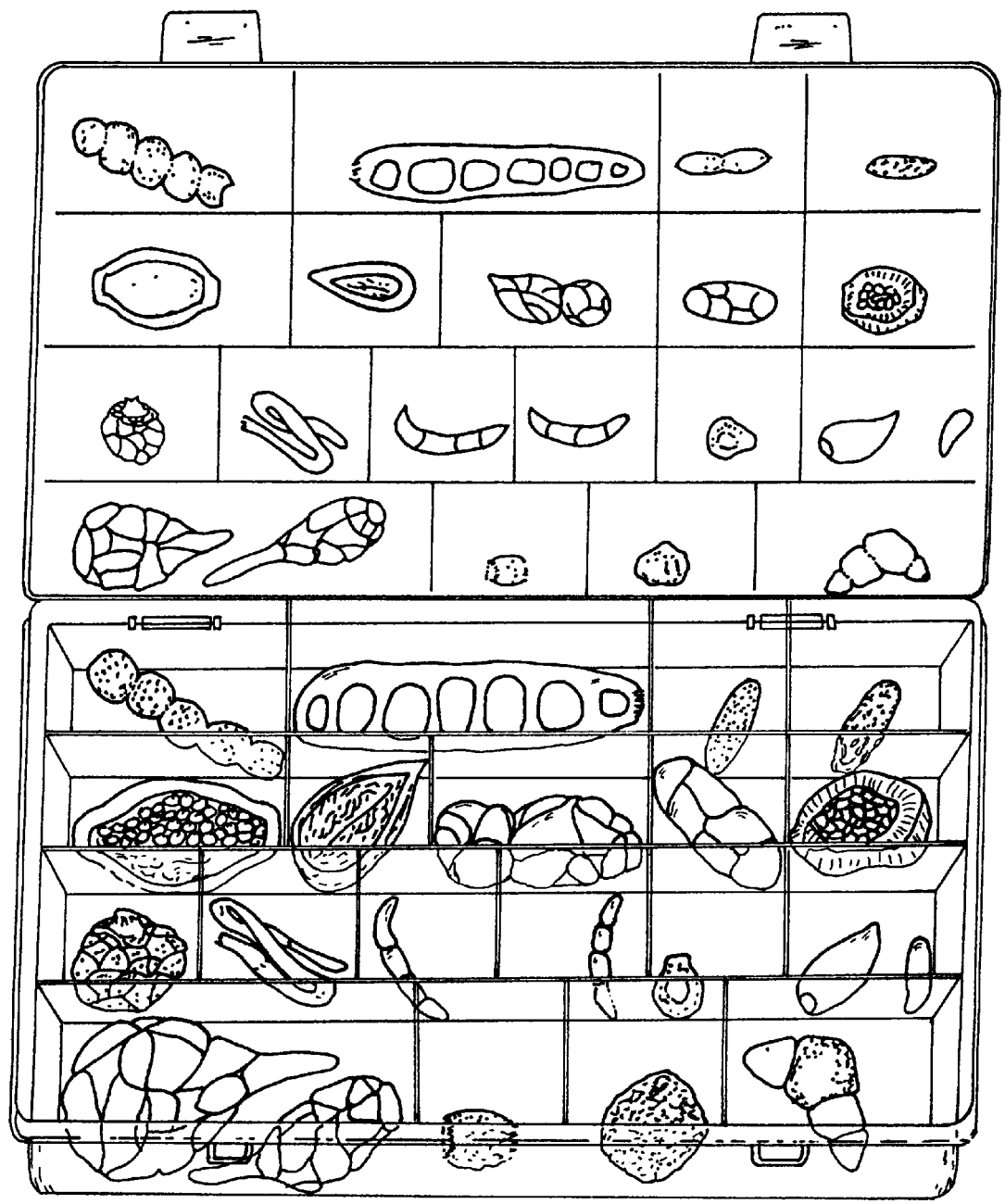
FIG. 6 is a top view of the fungal spore kit, showing both the actual three-dimensional fungal spores in the various compartments in the lower case and the upper depictions of the common spores.
Figure 7:
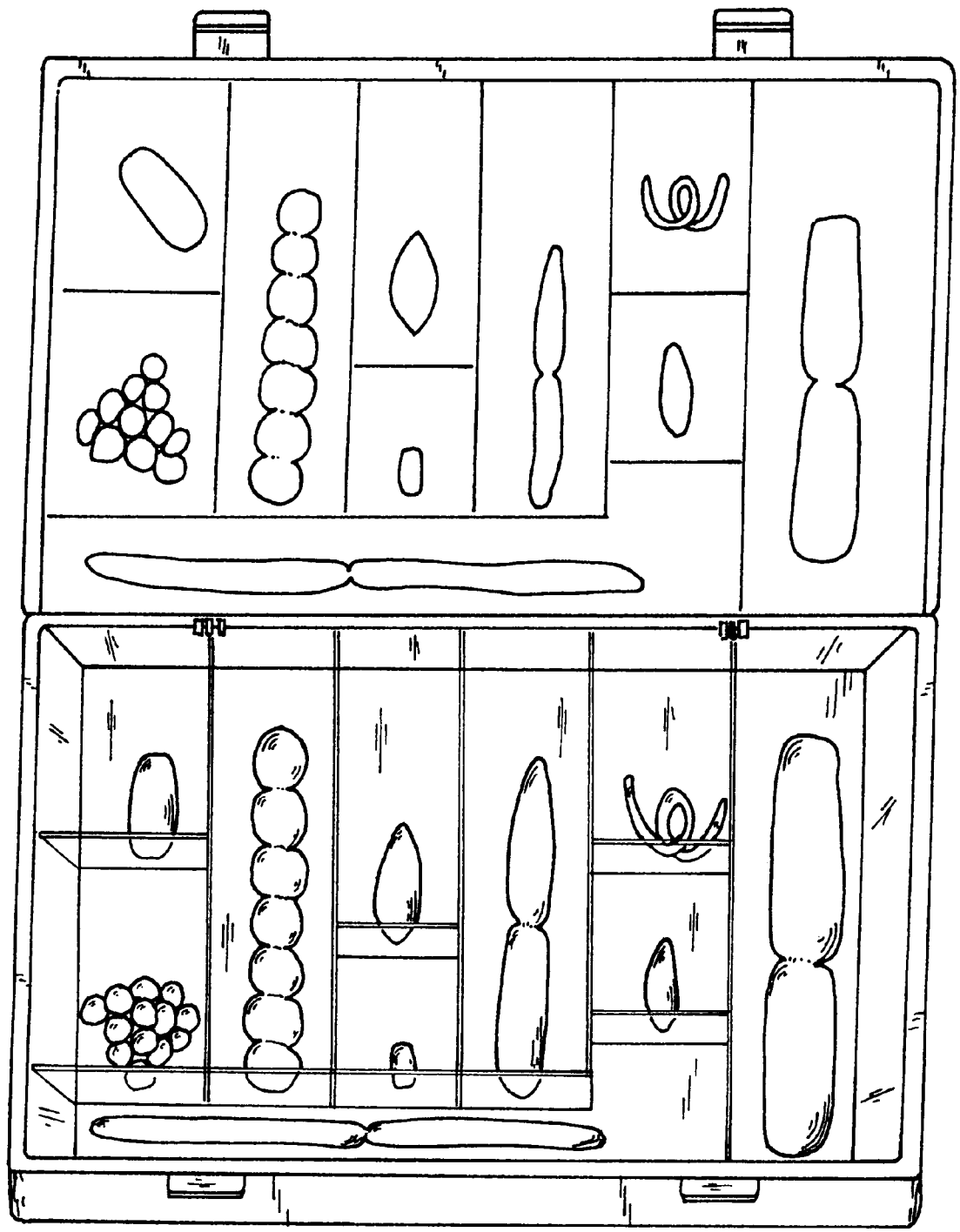
FIG. 7 is a top view of the bacteria kit shown with the upper lid open and showing the three-dimensional bacteria as they would be situated in the lower section of the kit.

As shown in Drawing FIG. 3, the following fungal spores located in that particular fungal spore kit are as follows: Torula at location #14, Helminthosporium and/or Drechslera at location #15, Cladosporium at location #16, Stachybotris at location #17; Erysiphae and/or Oidium at location #18, Peronospora at location #19, Stemphyllium at location #20, Pithomyces at location #21, Uredinales (Rust) at location #22, Epicoccum at location #23, Cercospora at location #24, Fusarium at location #25, Ascospore at location #26, Scopulariopsis at location #27, Basidiospore (2) at location #28, Alternaria (2) at location #29, Penicillium and/or Aspergillus at location #30, Ustilago (Smut) at location #31, and Curvularia at location #32.

This first kit provides a different grouping of fungal spores which may be used for scientific purposes different from the bacteria kit listed in FIGS. 1 and 2. These fungal spores may be conveniently grouped in kits depending on their particular uses. For example, fungal spores commonly found in air ducts, vents, or other ventilation systems may be grouped in one fungal spore kit if the investigation is centering on that type of airborne fungal spore. Additionally, other kits may be grouped according to bacteria commonly found in foods or in and around restaurants or the preparation of foods. Yet another kit may consist of fungal spores grouped according to the types of spores that may be found growing in the forest, or skin, or other living matters.

The above description of the fungal spore or bacteria kits is meant as a means of illustration only and not as a means of limitation. The general concept of having a three-dimensional, full-color kit comprising a number of generally grouped fungal spores or bacteria is one important aspect of this invention. Another important aspect of this invention, is the concept of providing three-dimensional, full-color fungal spores or bacteria for use in the laboratory or in teaching situations. Yet another important aspect of this invention is the method of use of the kits while in the laboratory setting, enabling the microscopist to view three-dimensional, full-color depictions of fungal spores or bacteria while still keeping his microscope slide in place. Obviously, many three-dimensional, full-color fungal spores and bacteria exist and may be grouped in the form of kits and used in the manner specified or in a similar manner. All of the above concepts are within the spirit and keeping of the instant disclosure.

Having fully disclosed my device, I claim:

1. An educational and scientific kit to aid in identifying unknown fungal spore specimens on a microscope slide, comprising:

a rectangular, compartmented, three-dimensional base having a flat top hingedly attached to said base, wherein said compartments are adapted to receive a plurality of fully detachable fungal spore models; and wherein said top has a corresponding written and graphic description of the contents of each of said compartments;

wherein said plurality of fully detachable fungal spore models comprises two or more three-dimensional, full-color representations of fungal spores, magnified 2,000 times, chosen from the group consisting essentially of:
   (1) Tourula;
   (2) Helminthosporium and/or Drechslera;
   (3) Cladosporium;
   (4) Stachybotris;
   (5) Erysiphae and/or Oidium;
   (6) Peronospora;
   (7) Stemphyllium;
   (8) Pithomyces;
   (9) Uredinales (Rust);
   (10) Epicoccum;
   (11) Cercospora;
   (12) Fusarium;
   (13) Ascospore;
   (14) Scopulariopsis;
   (15) Basidiospore;
   (16) Alternaria;
   (17) Penicillium and/or Aspergillus;
   (18) Ustilago (Smut); (19) Curvularia; and wherein said fungal spore models also depict individual spore shapes or other typical markings or indentations comprising one or more of the following characteristics:
   (1) Apical pore or pore;
   (2) Attachment scar;
   (3) Constricted;
   (4) Foot cell;
   (5) Refractive scar;
   (6) Septa or Septation;

whereby an unknown fungal spore located on a microscope slide may be compared to the known spore models by removing said fungal spore model from said kit, turning said model in three-dimensional directions, and comparing said known fungal spore model in a three-dimensional orientation to the unknown specimen on the microscope slide.

2. An educational and scientific kit to aid in identifying unknown bacteria specimens on a microscope slide, comprising:

a rectangular, compartmented, three-dimensional base having a flat top hingedly attached to said base, wherein said compartments are adapted to receive a plurality of fully detachable bacteria models, and wherein said top has a corresponding written and graphic description of the contents of each of said compartments;

wherein said plurality of fully detachable bacteria models comprises two or more three-dimensional, full-colored representations of bacteria magnified 10,000 times, chosen from the group consisting essentially of:

(1) Salmonella Gram Negative;
(2) Staphylococcus Gram Positive;
(3) Streptococcus Gram Positive;
(4) *Escherichia Coli* Gram Negative;
(5) Listeria Gram Positive;
(6) Lactobacillus Gram Positive;
(7) Campylobacter Gram Negative;
(8) Pseudomonus Gram Negative;
(9) Bacillus Gram Positive;
(10) Clostridium Gram Positive;

whereby, an unknown bacteria located on a microscope slide may be compared to the known bacteria model by removing said three-dimensional, full-color bacteria model from said kit, turning said bacteria model in a three-dimensional direction, and comparing said bacteria model in a three-dimensional orientation to the unknown specimen on said microscope slide.

* * * * *